May 19, 1970     D. H. YOUDEN     3,512,850

FLUID BEARING

Filed April 1, 1968

DAVID H. YOUDEN
INVENTOR.

United States Patent Office 3,512,850
Patented May 19, 1970

3,512,850
FLUID BEARING
David H. Youden, Worcester, Mass., assignor to The Heald Machine Company, Worcester, Mass., a corporation of Delaware
Filed Apr. 1, 1968, Ser. No. 717,573
Int. Cl. F16e 17/16
U.S. Cl. 308—9   2 Claims

ABSTRACT OF THE DISCLOSURE

This invention has to do with a fluid bearing and, more particularly, to such a bearing that is provided with one element that is self-aligning.

BACKGROUND OF THE INVENTION

Fluid bearings have decided advantages when used in the manufacture of machines. For instance, in the manufacture of a wheelhead for an internal grinding machine, particularly where it is desired to rotate the spindle at very high speeds. The friction in a fluid bearing is, of course, very low compared with other types of bearings, but there have been factors that have inhibited wider application. One inhibiting factor has been the high cost of manufacturing fluid bearings, principally caused by the need for precision geometry in the parts. Another problem is that of alinement; the angular deflection of a spindle due to load externally of the bearing can change the relationships between the parts of the bearing. Such a change can bring about rapid wear and deterioration of the bearing surfaces. These and other difficulties experienced with the prior art devices have been obviated in a novel manner by the present invention.

It is, therefore, an outstanding object of the invention to provide a fluid bearing in which the accuracy of the cooperating surfaces is not critical.

Another object of this invention is the provision of a fluid bearing in which the elements re-align themselves automatically.

A further object of the present invention is the provision of a self-aligning fluid bearing which is simple in construction and inexpensive to manufacture.

It is another object of the instant invention to provide a fluid bearing which is capable of long life with a minimum of maintenance despite variation of load external of the bearing.

With these and other objects in view, as will be apparent to those skilled in the art, the invention resides in the combination of parts set forth in the specification and covered by the claims appended hereto.

SUMMARY OF THE INVENTION

In general, the present invention has to do with a fluid bearing having a first element with a surface, having a second element with a similarly-shaped surface which lies parallel and slightly spaced from the first-mentioned surface, having a housing in which the first element is mounted, and having an elastomer strip lying between the first element and the housing to allow the first element to align itself relative to the second element.

More specifically, the surfaces of first and second elements are concentric circular cylinders and the strip is an annulus with a rectangular cross-section. A substantial gap is provided between the housing and the first element and the thickness of the strip determines the gap. In the preferred embodiment, the first element and the housing are provided with concentric circular cylindrical surfaces which are maintained in spaced condition by the annular elastomer strip.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
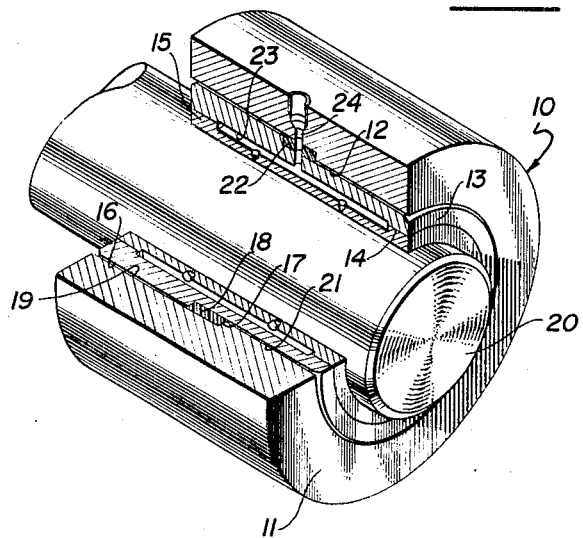
FIG. 1 is a perspective view with portions broken away of a fluid bearing incorporating the principles of the present invention.

Referring to FIG. 1, the fluid bearing, indicated by the reference numeral 10, is shown as having a housing 11 having a bore 12 in which is mounted a first element 13. The first element is generally tubular in form and has an inner bore 14 which fixedly carries a second element 15 which is also generally tubular. The element 15 is rotatably mounted on a shaft or spindle 20.

The bore 12 of the housing is provided with a counterbore 16 and there is a radial surface 17 which joins the two circular cylindrical surfaces. In the corner defined by the surface of the counterbore 16 and the radial surface 17 is located a strip 18 in the form of an annulus formed of a tough elastomeric material, such as a polyurethane. The strip has a rectangular cross-section with the long dimension extending in the axial direction; the outer cylindrical surface which lies against the surface of the counterbore 16 has the same diameter as the counterbore, but the diameter of the inner cylindrical surface is somewhat less than that of the bore 12. Now, the outer surface of the first element 13 is provided with a first cylindrical surface 19 which has a diameter substantially less than that of the counterbore 16, so that a gap is formed between them. Furthermore, it is also provided with a second surface 21 which has a much smaller diameter than the first portion 19 and a substantially smaller diameter than the coextensive surface of the bore 12, so that a gap is also formed between the surface of the bore 12 and the second surface 21 of the first element. A radial surface 22 extends between the surfaces 19 and 21 and the strip 18 nestles in the interior corner formed by this radial surface and the surface 21. The strip 18, therefore, is engaged on its end surfaces by the radial surfaces 17 and 27 and it is engaged on its cylindrical surfaces by the surfaces 16 and 21 of the housing and the first element, respectively. Because its thickness has been properly selected, the strip serves to determine the gap between the surfaces 16 and 19 and the gap between the surfaces of the bore 12 and the surface 21. A shallow pocket 23 lies between the cooperating cylindrical surfaces of the first element 13 and the second element 15. A passage 24 is connected to a source of pressure fluid, not shown, which fluid can be either a liquid or a gas. The passage extends from the exterior of the housing through the housing, the strip, and the first element to the center of the pocket 23. Small orifice passages extend through the element 15 from the pocket 23 into the annular bearing space between the element and the shaft 20.

Figure 2:
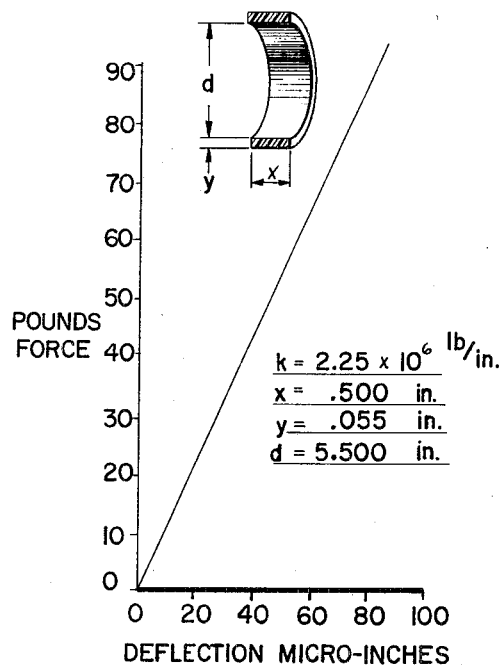
FIGS. 2 and 3 are graphs showing the operation of the bearing.
Figure 3:
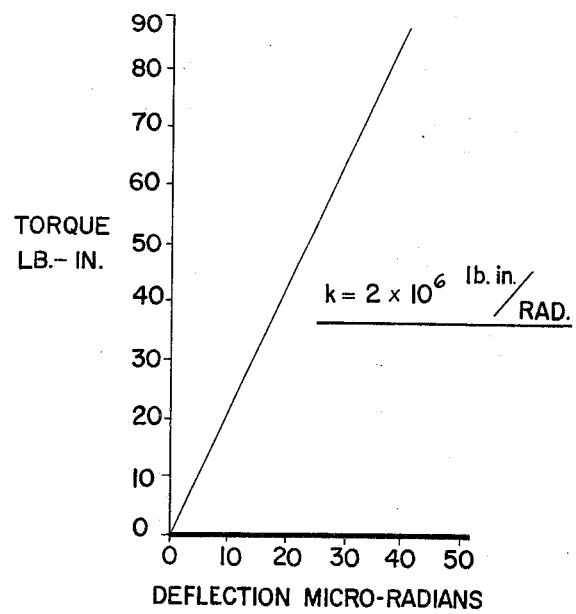

FIG. 2 shows the results of testing performed on a ring or strip 18 formed of polyurethane having an internal diameter of 5.500 inches, a width of .500 inch. and a thickness of .055 inch. The radial spring constant proved to be a high value of $2.25 \times 10^6$ lb./inch, while, as is evident in FIG. 3, the angular spring constant is at a low value of $2 \times 10^6$ lb./in./radian.

The operation of the invention will now be readily understood in view of the above description. The introduction of the pressure fluid through the passage 24 into the pocket 23 brings about a more-or-less conventional hydrostatic-hydrodynamic film of fluid in the gap between the cooperating surfaces of the first and second elements of the bearing. When the spindle 20 is unloaded, the fluid pressure pattern between the first and the second elements is quite symmetrical to a plane transversely of the axis of the spindle at the center of the bearing and through the opening of the passage 24 into the pocket. When the spindle is loaded symmetrically of the center of the bearing, the pressure pattern around the bearing becomes non-symmetrical, since the hydrostatic action causes a pressure buildup at the side of the bearing opposite the force application. The symmetry remains, however, so far as the transverse plane is concerned. However, when the force is applied non-symmetrically of the center of the bearing, it tends to bend the spindle out of alignment with the housing 11. The inner or second element 15 goes with the spindle and in a conventional fluid bearing becomes out of alignment with the inner surface or bore 14 in the outer or first elemetn 13. The results of mis-alignment of the bearing surfaces are high friction and wear.

When the spindle 20 of the present invention is forced out of alignment with the housing and the bearing surfaces tend toward misalignment, the unsymmetrical forces which develop cause the first element 13 to rock about the pivot line provided by the elastomer ring or strip 18. Eventually, the first element is forced into alignment again with the second element and proper bearing action is re-established. As a practical matter, the misalignment of the first and second elements never takes place to any great degree, since the first or outer element tends to "follow" the second or inner element. The use of a ring or strip which exhibits a very high radial spring constant and a low angular spring constant allow a less precise initial alignment of the bearing, because the compliance of the polyurethane ring allows the bearing to twist into alignment in its mount.

It is obvious that minor changes may be made in the form and construction of the invention without departing from the material spirit thereof.

The invention having thus been described, what is claimed as new and desired to secure by Letters Patent is:

1. A fluid bearing, comprising:
  (a) a first element having a cylindrical surface adapted to receive a shaft for lubricated rotation therein,
  (b) a second element surrounding the first element and forming a lubricant chamber therewith,
  (c) a housing in which the second element is mounted, the housing and the second element having a first set of concentric cylindrical surfaces having a gap between them and a second set of concentric cylindrical surfaces having a gap between them, the second set being of substantially larger diameter than the first set,
  the cylindrical surfaces of the housing having a radial surface joining their adjacent ends and the cylindrical surfaces of the second element having a radial surface joining their adjacent ends and facing toward and spaced from the radial surface of the housing, and
  (d) an elastomer strip in the form of an annulus of rectangular cross section lying between the radial surfaces to allow self-alignment of the second and first elements.

2. A fluid bearing as recited in claim 1, wherein a passage extends through the housing, the strip and the second element to provide fluid under pressure to a space between the cylindrical surface of the first element and the shaft.

References Cited

UNITED STATES PATENTS

| | | | |
|---|---|---|---|
| 2,102,415 | 12/1937 | Herreshoff | 308—26 |
| 2,196,388 | 4/1940 | Ewald | 308—26 |
| 2,473,267 | 6/1949 | Wightman | 308—236 |
| 3,360,309 | 12/1967 | Voorhies | 308—72 |

MARTIN P. SCHWADRON, Primary Examiner

F. SUSKO, Assistant Examiner

U.S. Cl. X.R.

308—72